United States Patent
Miyamoto et al.

(10) Patent No.: US 8,643,328 B2
(45) Date of Patent: Feb. 4, 2014

(54) BATTERY MANAGEMENT DEVICE, SECONDARY BATTERY DEVICE, AND VEHICLE

(75) Inventors: Yasuhiro Miyamoto, Saku (JP); Shinichiro Kosugi, Saku (JP); Yuki Kuwano, Fuchu (JP); Nobuo Shibuya, Hiratsuka (JP); Kazuto Kuroda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 798 days.

(21) Appl. No.: 12/892,384

(22) Filed: Sep. 28, 2010

(65) Prior Publication Data

US 2011/0076530 A1 Mar. 31, 2011

(30) Foreign Application Priority Data

Sep. 30, 2009 (JP) ................. 2009-228639

(51) Int. Cl.
*H02J 7/00* (2006.01)
(52) U.S. Cl.
USPC ........... 320/109; 320/110; 320/104; 320/116; 320/139
(58) Field of Classification Search
USPC ........................................ 320/109
See application file for complete search history.

(56) References Cited

U.S. PATENT DOCUMENTS

| | | | |
|---|---|---|---|
| 5,939,855 A * | 8/1999 | Proctor et al. | 320/104 |
| 6,031,354 A * | 2/2000 | Wiley et al. | 320/116 |
| 6,043,628 A * | 3/2000 | Perelle et al. | 320/119 |
| 7,471,064 B2 * | 12/2008 | Sobue et al. | 320/116 |
| 2005/0242775 A1 * | 11/2005 | Miyazaki et al. | 320/116 |
| 2006/0132085 A1 * | 6/2006 | Loubeyre | 320/104 |
| 2006/0273758 A1 * | 12/2006 | Sanada et al. | 320/107 |
| 2009/0058355 A1 * | 3/2009 | Meyer | 320/104 |
| 2009/0208821 A1 * | 8/2009 | Kosugi et al. | 429/61 |
| 2010/0090653 A1 | 4/2010 | Kuwano et al. | |

FOREIGN PATENT DOCUMENTS

| | | |
|---|---|---|
| JP | 11-150877 | 6/1999 |
| JP | 3331201 | 7/2002 |
| JP | 2007-244142 | 9/2007 |
| JP | 2008-193757 | 8/2008 |

* cited by examiner

*Primary Examiner* — Yalkew Fantu
(74) *Attorney, Agent, or Firm* — Oblon, Spivak, McClelland, Maier & Neustadt, L.L.P.

(57) ABSTRACT

According to one embodiment, a device includes a power management module to which a power is supplied from an external power source, a power source supply circuit to which a power is supplied from the power management module via a first input terminal, a latch circuit configured to be operated by a power supplied from the power supply circuit or a power supplied via a second input terminal, a circuit configured to output a logic signal that sets a shutdown signal output from the latch circuit to a third input terminal, and a logic communication circuit to which a logic signal is supplied via the third input terminal and which supplies the logic signal to a forth terminal of the larch circuit. The shutdown signal output from the latch circuit is set to an predetermined level when the logic signal is set to a second level from a first level.

5 Claims, 5 Drawing Sheets

BATTERY MANAGEMENT DEVICE, SECONDARY BATTERY DEVICE, AND VEHICLE

CROSS-REFERENCE TO RELATED APPLICATIONS

This application is based upon and claims the benefit of priority from Japanese Patent Application No. 2009-228639, filed Sep. 30, 2009; the entire contents of which are incorporated herein by reference.

FIELD

Embodiments described herein relate generally to a power management device, a secondary battery device, and a vehicle.

BACKGROUND

In a secondary battery device comprising an assembled battery including a plurality of secondary battery cells, the voltage of each of the secondary battery cells, the temperature of the assembled battery, and the like are constantly monitored, in order to avoid the secondary battery cells from being overdischarged or being in an abnormal state.

Further, in general, in an assembled battery that uses a plurality of secondary battery cells combined in series, the energy stored in the combined secondary battery cells becomes uneven, due to overdischarge or unevenness in temperature of the secondary battery cells.

The unevenness in energy stored in the secondary battery cells makes it impossible to perform efficient overdischarge that can maximize the function as an assembled battery. Conventionally, a resistive discharge method has been proposed as a circuit for equalizing the energy.

In a conventional voltage correction circuit of a secondary battery, unevenness in voltage or capacity of the battery is judged, and a battery with a high energy is connected to a resistance and let the battery discharged. Further, the battery voltage correction device of a conventional assembled battery performs a discharge process so as to adjust the level before charge. Further, according to a conventional battery group control device and a battery power system, an approach of measuring the energy between the unit cells at a no-load voltage, calculating the remaining capacity between the unit cells, and bypassing the charge/discharge current of a cell having a deviation equal to or greater than a set value with respect to an average remaining capacity of the unit cells.

A secondary battery device that equalizes the energy comprises an assembled battery module provided with an assembled battery including a plurality of secondary battery cells and an assembled battery monitoring circuit, and a control device (MPU) configured to control the operation and the like of the assembled battery monitoring circuit, for example. The assembled battery monitoring circuit is provided with an equalization processing module configured to discharge the secondary battery cells. The control device is fed from an external power source provided outside.

In order to prevent deterioration of a battery by preventing an adverse effect caused by the equalization circuit on the battery when a battery for an electrical component that is used as an external power source is broken, or when a power source line of a battery for an electrical component is broken, e.g., disconnected, a power source device for a vehicle including a stop circuit for stopping an equalization circuit has conventionally been proposed.

A relatively long time is required to discharge a secondary battery cell in which a high energy is stored and to equalize the energy of a plurality of secondary battery cells forming an assembled battery. Further, when a lithium ion battery is adopted as a secondary battery cell, in particular, the voltage or temperature of the secondary battery cells needs to be constantly monitored so as to avoid heat generation, for example, due to overdischarge.

On the other hand, when a control device for controlling an assembled battery monitoring circuit is constantly monitored, it is difficult to suppress consumption of the external power source. In particular, when insulating communications are performed in an interface circuit between an assembled battery monitoring circuit and a control device, it was difficult to suppress power consumption in an insulating communication circuit. Accordingly, forming a secondary battery device such that the voltage detecting module or the equalization processing module of the assembled battery monitoring circuit can perform energy equalization, even during the period while the feed to the control device is stopped, has been contemplated.

In that case, however, even if the assembled battery module is removed from a control device for replacement, for example, since the energy stored in the assembled battery is consumed when the assembled battery monitoring circuit continues monitoring voltages of the secondary battery cells or equalizing the energy, it has been difficult to achieve low power consumption.

DETAILED DESCRIPTION

In general, according to one embodiment, a power management device, comprises a power source supply management module to which a power is supplied from an external power source; a power source supply circuit to which a power is supplied from the power source supply management module via a first power source input terminal; a latch circuit configured to be operated by a power supplied from the power supply circuit or a power supplied via a second power source input terminal; a control circuit configured to output a logic signal that sets a shutdown signal output from the latch circuit to a logic signal input terminal; and a logic communication circuit to which a logic signal is supplied via the logic signal input terminal and which supplies the logic signal to a set signal input terminal of the larch circuit. The shutdown signal output from the latch circuit is set to an operation maintenance level when the logic signal is set to a second level from a first level.

Hereinafter, a power management device, a secondary battery device, and a vehicle comprising a secondary battery device according to an embodiment will be described, with reference to the accompanying drawings.

Figure 1:
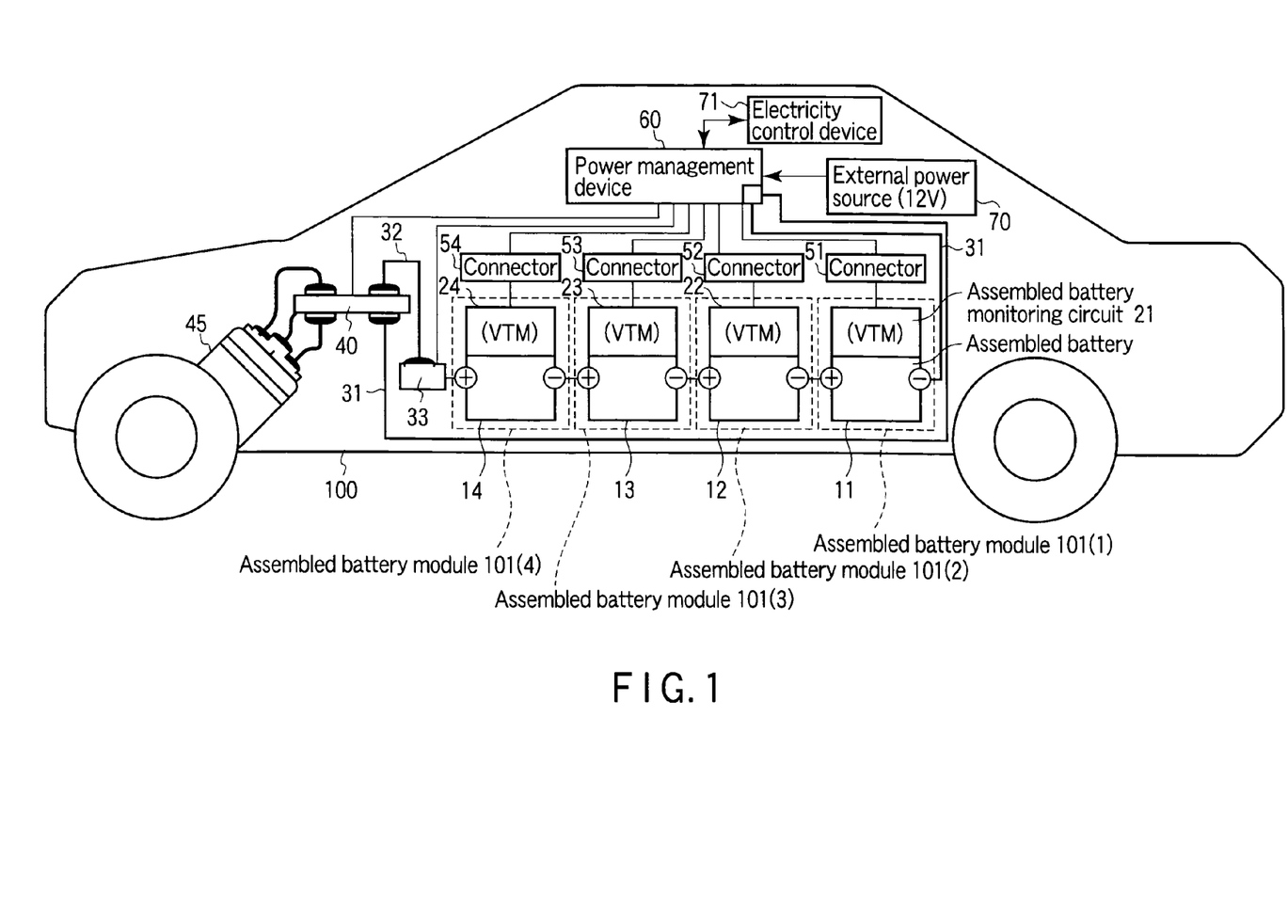
FIG. 1 illustrates a schematic configuration example of a secondary battery device and a vehicle including the secondary battery device, according to an embodiment.

FIG. 1 illustrates an example in which a battery device is installed in a vehicle 100 according to an embodiment. FIG. 1 only schematically shows the vehicle 100, the portion of the vehicle 100 where the secondary battery device is installed, a driving motor of the vehicle 100, and the like.

In the secondary battery device, a plurality of assembled battery modules 101(1), 101(2) . . . 101(4) are connected in series. The assembled battery modules 101(1), 101(2) . . . 101(4) can be independently detached, and can be replaced with another assembled battery module.

One terminal of a connection line 31 is connected to a negative electrode terminal of the assembled battery module 101(1) on a bottom-end side (the lower-voltage side will be referred to as "bottom-end") of the secondary battery device. The connection line 31 is connected to a negative electrode input terminal of an inverter 40 via a current detecting module in a battery management device 60, which will be described later.

Further, one terminal of a connection line 32 is connected to a positive electrode terminal of the assembled battery module 101(4) on a high-end side (the higher-voltage side will be referred to as "high-end") of the secondary battery device via a switch device 33. The other terminal of the connection line 32 is connected to a positive electrode input terminal of the inverter 40.

The switch device 33 includes a precharge switch SWP (shown in FIG. 5) configured to be turned on when a battery is charged, and a main switch SWM (shown in FIG. 5) configured to be turned on when a battery output is supplied to a load. Each of the precharge switch SWP and the main switch SWM includes a relay circuit configured to be turned on and off by a signal that is supplied to a coil arranged in the vicinity of a switching element.

The inverter 40 converts an input direct-current voltage into a three-phase alternating-current (AC) high voltage for motor driving. In the inverter 40, an output voltage is controlled based on a control signal from a power management device (Battery Management Unit: BMU) 60 or an electricity control device 71 configured to control the entire vehicle operation, which will be described later. The three-phase output terminal of the inverter 40 is connected to an input terminal of each of the three phases of a motor 45. Rotation of the motor is transmitted to driving wheels WR, WL via a differential gear unit, for example.

An independent external power source 70 is connected to the power management device 60. The external power source 70 is a rated lead-acid battery of 12 V. Further, an electricity control device 71 configured to manage the overall vehicle in response to an operation input by an operator, for example, is also connected to the battery management device 60.

Figure 2:
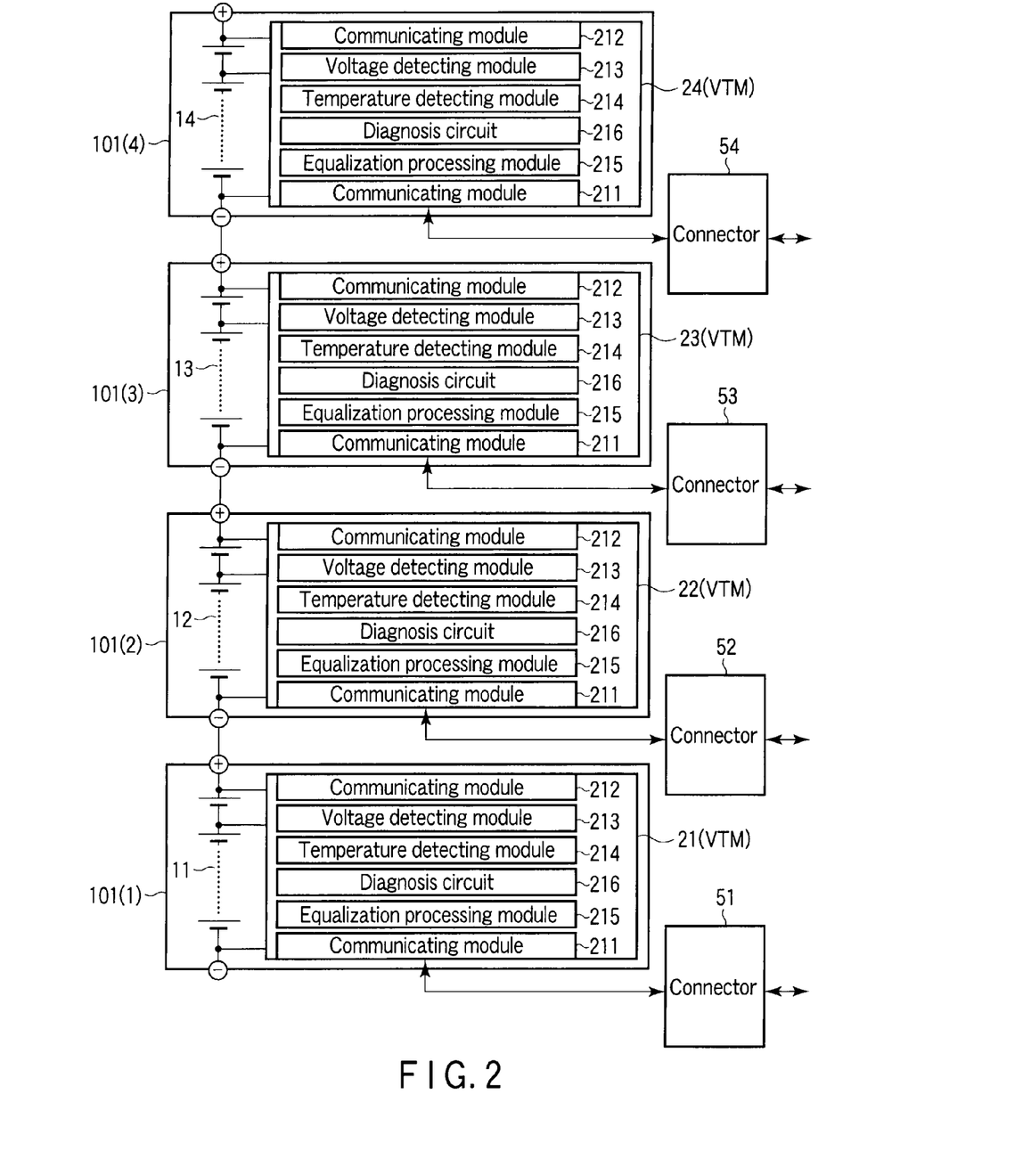
FIG. 2 illustrates a configuration example of an assembled battery module of a secondary battery device shown in FIG. 1.

FIG. 2 illustrates functional blocks of assembled battery monitoring circuits (Voltage Temperature Monitoring: VTM) 21-24. As shown in FIGS. 1 and 2, the assembled battery modules 101(1), 101(2) . . . 101(4) include assembled batteries 11, 12, 13, 14 and assembled battery monitoring circuits 21, 22, 23, 24, respectively.

A communicating portion 211 on the bottom-end side of each of the assembled battery monitoring circuits 21-24 is connected to the battery management device 60 via connectors 51-54. In the present embodiment, by arranging the assembled battery monitoring circuits 21-24 in the vicinity of the assembled batteries 11-14, voltage information of the assembled batteries 11-14 is obtained with high precision, and thereby precision of monitoring is improved.

A configuration may be provided such that the communicating portions 211, 212 between the assembled battery monitoring circuits 21, 22 are connected in series, between communicating portions 211, 212 between the assembled battery monitoring circuits 23, 24 are connected in series, and the communicating portion 211 of the assembled battery monitoring circuits 21, 23 is connected to the battery management device 60 via a connector. In that case, the assembled battery monitoring circuits 21, 22 are connected via the communicating portions 211, 212 and can communicate with each other, and the assembled battery monitoring circuits 23, 24 are connected via the communicating portions 211, 212 and can communicate with each other.

When the assembled battery monitoring circuits 21, 22 are connected in series, an information input/output terminal of the bottom-end side communicating portion 211 of the assembled battery monitoring circuit 21 is connected to a battery management device 60 via a connector. The information input/output terminal of the high-end side communicating portion 212 of the assembled battery monitoring circuit 21 is connected to an information input/output terminal on the bottom-end side of the assembled battery monitoring circuit 22.

Further, when the assembled battery monitoring circuits 23, 24 are connected in series, an information input/output terminal of the bottom-end side communicating portion 211 of the assembled battery monitoring circuit 23 is connected to the battery management device 60 via a connector. The information input/output terminal on the upper level side of the assembled battery monitoring circuit 23 is connected to an information input/output terminal on the bottom-end side of the assembled battery monitoring circuit 24.

Since the functional blocks of the assembled battery monitoring circuits 21-24 are the same, a functional block of the assembled battery monitoring circuit 21 will be described as a representative. The assembled battery monitoring circuit 21 includes the bottom-end side communicating portion 211 connected to the connector 51. The assembled battery monitoring circuit 21 includes the high-end side communicating portion 212, which is used when the assembled battery monitoring circuit 21 is connected in series to another assembled battery monitoring circuit.

Further, the assembled battery monitoring circuit 21 includes a voltage detecting module 213, a temperature detecting module 214, an equalization processing module 215 configured to equalize the voltages of battery cells, and a diagnosis circuit 216 that outputs a pulse signal based on a fundamental frequency of sequence control.

The voltage detecting module 213 detects a voltage (hereinafter referred to as a secondary battery cell voltage) between the terminals of each of the secondary battery cells 11(1)-11(x) of an assembled battery 11. The detected secondary battery cell voltage is transferred to the battery management device 60 via the communicating portion 211. The temperature detecting module 214 detects a temperature of each of the secondary battery cells 11(1)-11(x), or a temperature in the vicinity of the secondary battery cells. The detected temperature data is transferred to the battery management device 60 via the communicating portion 211.

In a secondary battery device, it is known that energy becomes uneven among assembled secondary battery cells due to charge/discharge of the secondary battery or unevenness in temperature. Unevenness in energy between the secondary battery cells makes it impossible to perform efficient charge/discharge that makes full use of functions as a secondary battery device.

If the device is charged while an equalization process is not performed and a secondary battery cell with a large remaining amount exists, the secondary battery cell with a large remaining amount may reach a full-charged state in a short period of time before the secondary battery cell with a small remaining amount becomes a full-charged state, and the overall charge may be completed. In order to prevent this, the equalization processing module 215 needs to equalize the energy among the secondary battery cells at the time of charging.

Further, a sequencer or a control module is provided in each of the assembled battery monitoring circuits 21-24, and collectively manages operation timing of data transmission, switching, and the like.

Figure 3:
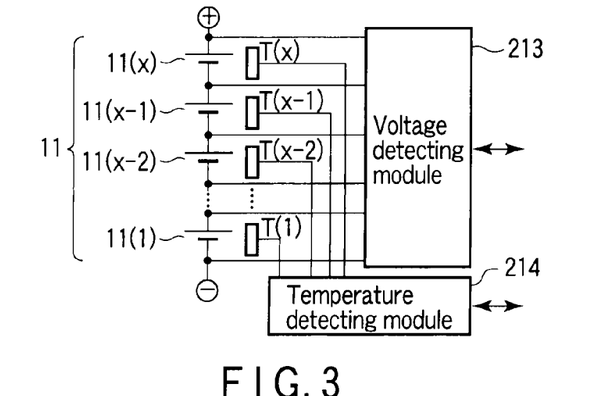
FIG. 3 illustrates a configuration example of a voltage detecting module and a temperature detecting module in an assembled battery monitoring circuit of a secondary battery device shown in FIG. 1.

FIG. 3 schematically illustrates a configuration example of a voltage detecting module 213 and a temperature detecting module 214 of the assembled battery monitoring circuit 21. The secondary battery cells 11(1)-11(x) connected in series form the assembled battery 11. A positive electrode terminal and a negative electrode terminal of each of the secondary battery cells 11(1)-11(x) are connected to a voltage detecting module 213.

The voltage detecting module 213 individually measures a secondary battery cell voltage of each of the secondary battery cells. Further, temperature sensors T(1)-T(x) are arranged in the vicinity of each of the secondary battery cells 11(1)-11(x). An output terminal of each of the temperature sensors T(1)-T(x) is connected to the temperature detecting module 214. The temperature detecting module 214 digitalizes an output of each of the temperature sensors T(1)-T(x), and outputs the digitized output to the communicating module.

Figure 4:
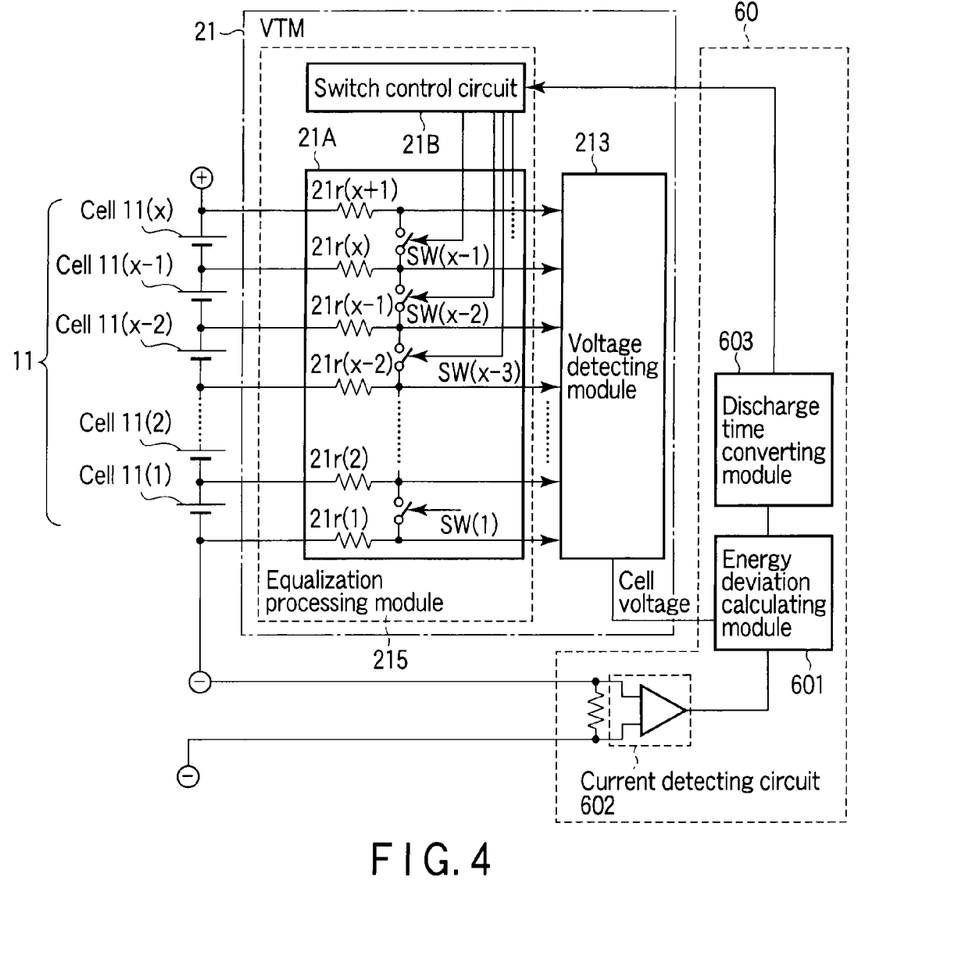
FIG. 4 illustrates a configuration example of equalizing energy in an assembled battery monitoring substrate and a battery management device shown in FIG. 1.

FIG. 4 illustrates an equalization processing module 215. A negative electrode terminal and a positive electrode terminal of each of the secondary battery cells 11(1)-11(x) are connected to the voltage detecting module 213 via discharge resistances 21r(1)-21r(x+1), respectively.

One terminals of the discharge resistance 21r(1) and the discharge resistance 21r(2) are connected to a negative electrode terminal and a positive electrode terminal of the secondary battery cell 11(1), and the other terminals are connected via a discharge switch SW(1).

One terminals of the discharge resistance 21r(2) and the discharge resistance 21r(3) are connected to a negative electrode terminal and a positive electrode terminal of the secondary battery cell 11(2), and the other terminals are connected via a discharge switch SW(2). Similarly, two pairs of discharge resistances are connected to a negative electrode terminal and a positive electrode terminal of a corresponding secondary battery cell, and the other terminals are connected via a corresponding discharge switch.

The discharge resistances 21r(1)-21r(x+1) and the discharge switches SW(1)-SW(x+1) are included in an equalization circuit 21A. The discharge switches SW(1)-SW(x+1) are controlled to be turned on or off by the switch control circuit 21B.

The voltage detecting module 213 detects a secondary battery cell voltage of each of the secondary battery cells 11(1)-11(x). The detected secondary battery cell voltage is fetched into an energy deviation calculating module 601 of the battery management device 60 via the communicating module 211. Further, the current flowing through the assembled battery 11 is detected by the current detecting circuit 602 and fetched into the energy deviation calculating module 601.

In order to detect the energy deviation between the secondary battery cells, i.e., unevenness in secondary battery cell voltage, a voltage is supplied between the positive electrode and the negative electrode of the assembled battery 11. When an energy deviation exists between the secondary battery cells, a difference is caused in time required to reach a specific voltage predetermined by each of the secondary battery cells.

For the sake of simplicity, assume that there are three secondary battery cells (not shown) connected in series, and a difference is caused in time required for the secondary battery cells AX, BX, CX, to reach a specific voltage. Assume that the secondary battery cell AX has reached the specific voltage in a shortest period of time. The time required will be referred to as a reference time t0, which is 0 second.

The time required for the secondary battery cells BX, CX, to reach a specific voltage from the reference time t0 will be referred to as t1 and t2, respectively. A capacity difference (mAh) between the secondary battery cell AX and the secondary battery cell AB, and a capacity difference (mAh) between the secondary battery cell AX and the secondary battery cell CX are calculated based on the required times t1, t2, and the value of the current flowing through the assembled battery 11.

Further, it is calculated how long each of the secondary battery cells BX, CX needs to be discharged in order to make the secondary battery cells BX, CX have the same remaining capacity (State Of Charge: SOC) as that of the secondary battery cell AX. This calculation is performed by a discharge time converting module 603, and the discharge time data of each of the secondary battery cells is obtained.

The discharge time data of each of the secondary battery cells is input to the switch control circuit 21B in the equalization processing module 215. The switch control circuit 21B controls the discharge switches SW-SW(x+1) in the equalization circuit 21A to be turned on or off.

Here, the discharge switch corresponding to the secondary battery cell to be discharged is turned on, and the secondary battery cell is discharged, i.e., the energy is discharged. Thereby, energy is equalized between a secondary battery cell with a high energy and a secondary battery cell with a low energy.

Figure 5:
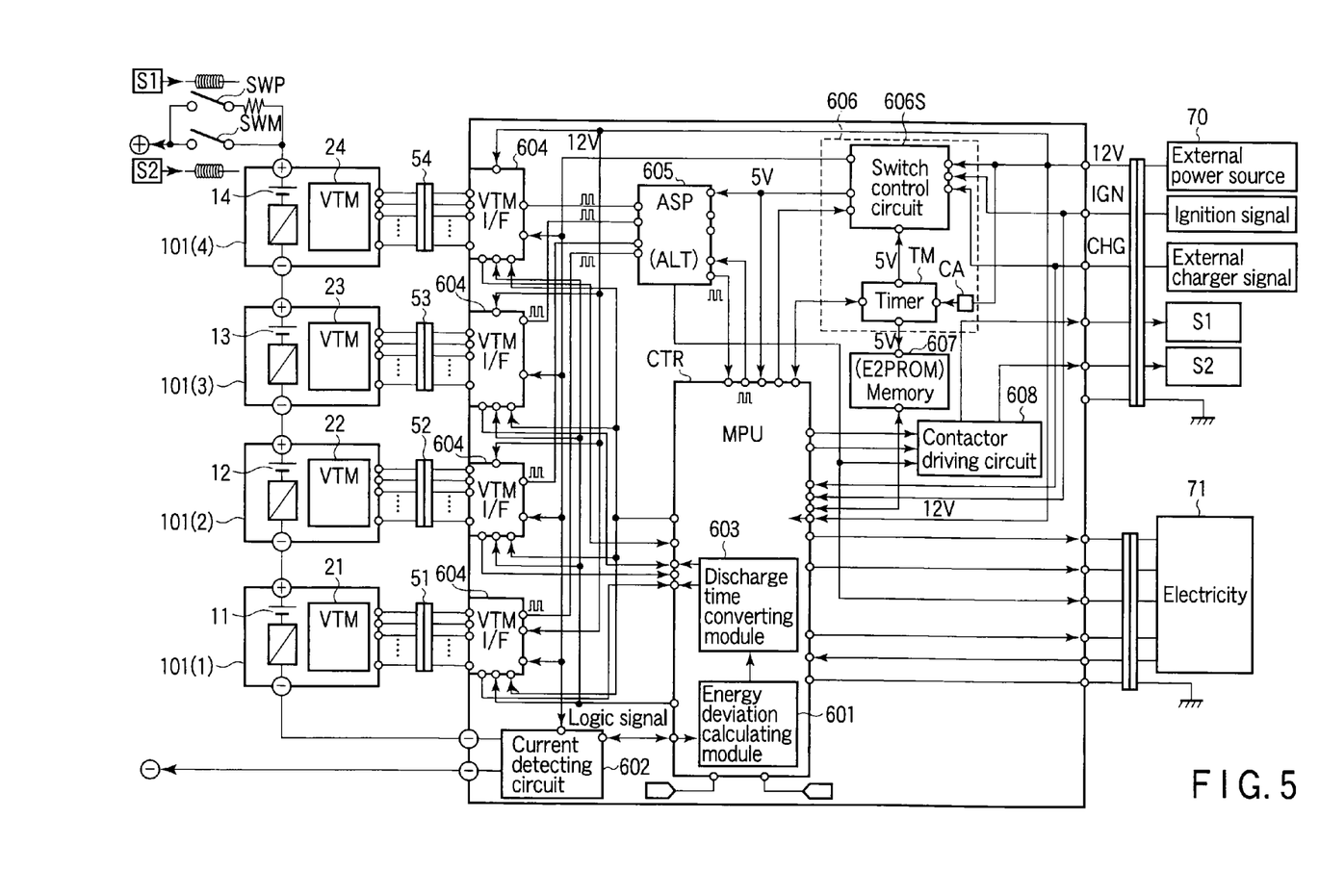
FIG. 5 illustrates a configuration example of a battery management device of a secondary battery device shown in FIG. 1.

FIG. 5 illustrates an overall block of the battery management device 60. As shown in FIG. 5, the battery management device 60 includes a current detecting circuit 602, an interface circuit 604 connected to the communicating module 211 of the assembled battery monitoring circuits 21-24 via connectors 51-54, an alert signal processor 605 to which a pulse signal output from the diagnosis circuit 216 of the assembled battery monitoring circuit 21-24 is supplied and which outputs an alert signal, a power supply management module 606 to which a power supply voltage is supplied from the external power source 70, a contactor driving circuit 608, a memory 607, and a control circuit (MPU) CTR configured to control the operation of the secondary battery device.

The memory 607 is an electronically erasable and programmable read only memory (EEPROM), for example. A program defining the operation of the control circuit CTR is recorded in the memory 607. The energy deviation calculation module 601 and the discharge time converting module 603 shown in FIG. 4 are included in the control circuit CTR.

A power source voltage, an ignition signal IGN, and an external charger signal CHG are supplied to the battery management device 60 via a connector CN1 via an ignition (not shown) and an external charger (not shown). Further, the battery management device 60 transmits and receives signals to and from the electricity control device 71 via a connector CN2.

Data such as voltage values of secondary battery cells and a temperature value of the assembled battery, a pulse signal output from the diagnosis circuit 216, and a communication-purpose power source voltage signal are supplied via connectors 51-54. A clock signal, a data signal, and a shutdown signal (SHDN) are supplied to the assembled battery monitoring circuits 21-24 from an interface circuit 604 via the connectors 51-54.

The interface circuit 604 supplies data such as the voltage values of the secondary battery cells, and the temperature value of the assembled battery to the control circuit CTR through bilateral serial communications, and supplies a pulse signal output from the diagnosis circuit 216 to the alert signal processor 605.

The alert signal processor 605 judges whether the pulse signal supplied from the interface circuit 604 and the alert signal supplied from the control circuit CTR are normal or abnormal. When the pulse signal is normal, the alert signal processor 605 outputs an alert signal that is turned on and off at a certain frequency, when the pulse signal is abnormal, the alert signal process 605 outputs an alert signal of a certain value.

The alert signal output from the alert signal processor 605 is connected to the electricity control device 71 connected via the control circuit CTR, the contactor driving circuit 608, and the connector CN2.

The contactor driving circuit 608 outputs a signal S1 that controls the operation of the precharge switch SWP of the switch device 33 and a signal S2 that controls the operation of the main switch SWM under the control of the control circuit CTR.

The signals S1, S2 are supplied to the switch device 33 via the connector CN1. The precharge switch SWP and the main switch SWM are turned on or off by the signals S1, S2 supplied to a coil arranged in the vicinity thereof.

For example, when the pulse signal is abnormal, the control circuit CTR judges that a corresponding assembled battery monitoring circuit is abnormal based on the supplied alert signal, controls the contactor driving circuit 608, and turns off the precharge switch SWP and the main switch SWM.

The power supply management module 606 supplies a power supply voltage to the current detecting circuit 602, the interface circuit 604, the alert signal processor 605, the memory 607, and the control circuit CTR. The power source supply management module 606 includes a switching circuit 606S that turns on or off supply of a power supply voltage to the control circuit CTR, and a timer TM.

A power source voltage of 12V output from the external power source 70 is converted into a direct-current voltage of 5V by a DC/DC circuit CA arranged in the former stage of the timer TM and supplied to the timer TM. The ignition signal IGN, the external charger signal CHG, the shift control signal from the control signal, a wakeup signal from the timer TM, and the power source voltage from the external power source 70 are supplied to the switching circuit 606S.

The wakeup signal from the timer TM is a signal that is turned on (=1) every set time. The timing at which the wakeup signal is turned on is set by the control circuit CTR.

The ignition signal IGN is a signal that is turned on (equal to or greater than a predetermined voltage) when a key is inserted into an ignition, and is turned off (less than a predetermined voltage) when the key is removed. The external charger signal CHG is a signal that is turned on (equal to or greater than a predetermined voltage) when the external charger is connected to a secondary battery device, and is turned off (less than a predetermined voltage) when the connection is released. The wakeup signal, the ignition signal IGN, and the external charger signal CHG are also supplied to the control circuit CTR.

When the secondary battery device is installed in a device other than a vehicle, the ignition signal becomes a signal that is turned on when a power-on operation is performed on the device in which the secondary battery device is installed, and is turned off when a power-off operation is performed.

When at least one of the ignition signal IGN, the external charger signal CHG, and the wakeup signal is turned on, the switching circuit 606S converts the power source voltage supplied from the external power source 70 to a direct-current voltage of 5V via an inner DC/DC circuit, and supplies the converted voltage to the alert signal processor 605 and the control circuit CTR.

Further, when at least one of the ignition signal IGN, the external charger signal CHG, and the wakeup signal is turned on, the switching circuit 606S converts the power-source voltage supplied from the external power source 70 to a direct-current voltage of a predetermined size via an inner DC/DC circuit, and supplies the converted voltage to the interface circuit 604 and the current detecting circuit 602.

Here, when one of the ignition signal IGN, the external charger signal CHG, and the wakeup signal is turned on, the switching circuit 606S is turned on, and feeding is started, the control circuit CTR confirms which signal has been turned on and thereby the power source voltage has been supplied.

The wakeup signal is supplied to the control circuit CTR from the timer TM, and the ignition signal IGN and the external charger signal CHG are supplied via the connector CN1. Accordingly, the control circuit CTR confirms which signal has turned on the switching circuit 606S. After confirming which signal has supplied the power source voltage, the control circuit CTR turns on the shift control signal and maintains the state in which the power source voltage is supplied.

The control circuit CTR monitors the wakeup signal, the ignition signal IGN, and the external charger signal CHG, and turns off the shift control signal and turns off the switching circuit 606S when all the signals are turned off. Thereby, supply of power source voltage to the alert signal processor 605, the interface circuit 604, and the current detecting circuit 602 is stopped.

The control circuit CTR supplies a logic signal for causing the assembled battery monitoring circuits 21-24 to continue the operation to a logic signal input terminal T3 of the interface circuit 604. As will be described later, the control circuit CTR sets the logic signal from first level to a second level when the assembled battery monitoring circuits 21-24 are activated.

Figure 6:
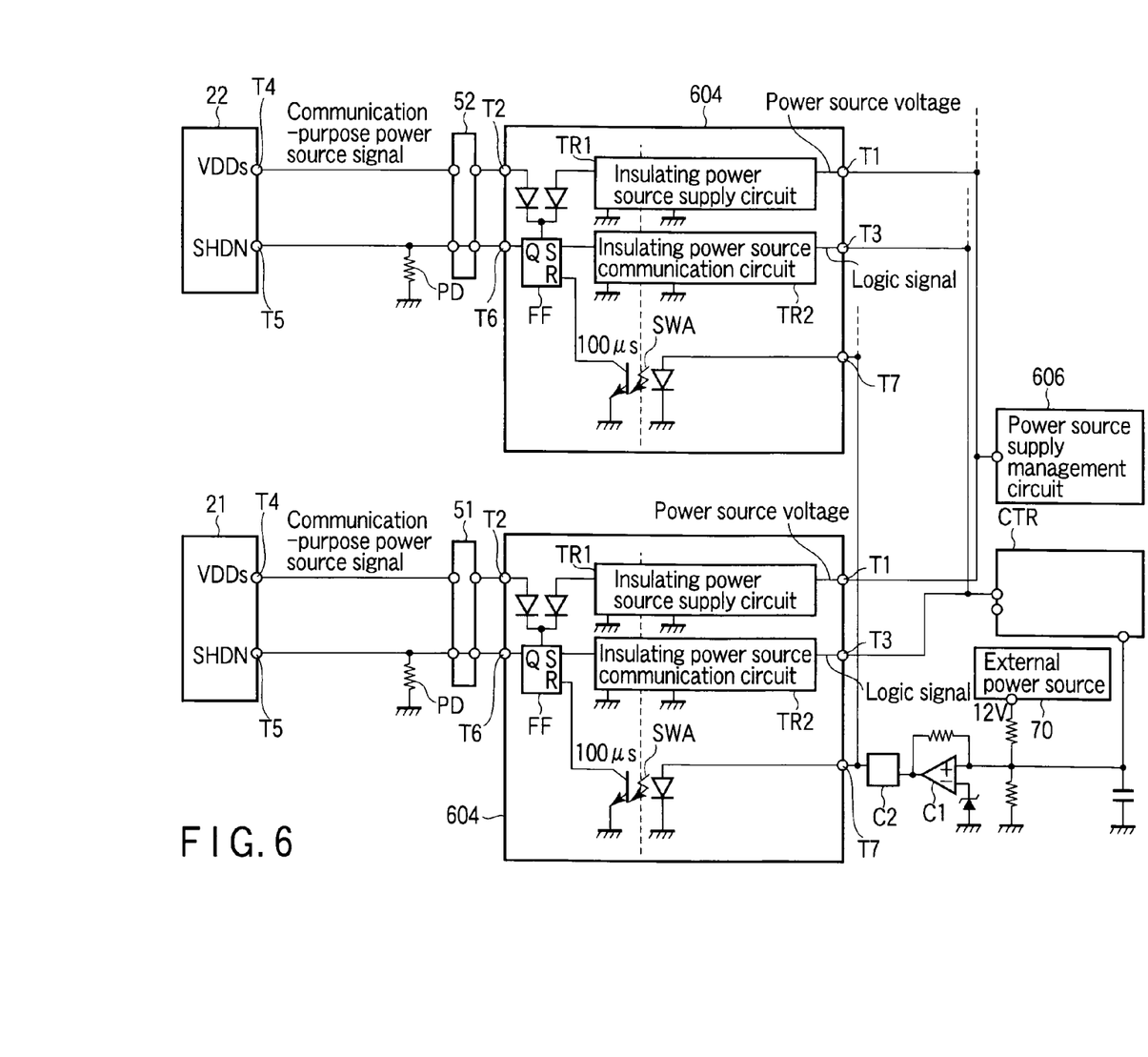
FIG. 6 illustrates a configuration example of an assembled battery monitoring circuit and an interface circuit shown in FIG. 5.

FIG. 6 shows a configuration example of the interface circuit 604. In FIG. 6, an interface circuit 604 connected to the assembled battery monitoring circuits 21, 22 via the connectors 51, 52 is shown, but an interface circuit 604 connected to the assembled battery monitoring circuits 23, 24 via the connectors 53, 54 have the same configuration.

As shown in FIG. 6, the interface circuit 604 includes an insulating power source supply circuit TR1 to which a power source voltage is supplied via a first power source input terminal T1 from the power source supply management module 606, an insulating logic communication circuit TR2 to which a logic signal is supplied via a logic signal input terminal T3 from the control circuit CTR, and a latch circuit FF to which the logic signal is supplied to a set signal input terminal S via an insulating logic communicating circuit TR2. The latch circuit FF is operated by a power supplied from the insulating power source supply circuit TR1, or a power supplied via the second power source input terminal T2.

Further, in the former stage of the interface circuit 604, there are provided a comparator circuit C1 in which a power source voltage from the external power source 70 is supplied to a positive input terminal, and a one-shot circuit (a monostable multivibrator) C2 to which an output signal from the comparator circuit C1 is supplied. The interface circuit 604 further includes a switch circuit (photo coupler) SWA that is switched by a signal output from the monostable multivibrator C2. A negative input terminal of the comparator circuit C1 is grounded via the photo coupler.

Since the assembled battery monitoring circuits 21-24 and the battery monitoring device 60 have different ground potentials, the insulating power source supply circuit TR1, the insulating logic communication circuit TR2, and the switch circuit SWA perform insulating communications between the assembled battery monitoring circuits 21-24 and the battery management device 60.

The power source voltage supplied from the power source supply management module 606 is input to the insulating power source supply circuit TR1. The insulating power source supply circuit TR1 includes a trans circuit, for example. When a power source voltage is applied, a current flows through a coil of the insulating power source supply circuit TR1, and a power source voltage is supplied to the latch circuit FF via the diode D1.

The assembled battery monitoring circuits 21-24 include a power source circuit (not shown) and a power source output terminal T4, in which a communication power source voltage signal VDDs output from the power source circuit is output to a second power source input terminal T2. When the communication power source voltage signal VDDs output from the assembled battery monitoring circuits 21-24 is input to the interface circuit 604, the signal is supplied to the latch circuit FF via a diode D2.

Accordingly, the latch circuit FF obtains a power source voltage (power) from both of the power source supply management module 606 and the assembled battery monitoring circuits 21-24. Thereby, even when supply of the power source voltage is stopped by the switching circuit 606S of the power source supply management module 606, the latch circuit FF can be operated by the communication power source voltage signal VDDs from the assembled battery monitoring circuits 21-24.

The control circuit CTR sets the logic signal to the second level from the first level when the assembled battery monitoring circuits 21-24 are activated. The insulating logic communication circuit TR2 includes a trans circuit, for example. When a logic signal is applied via the logic signal input terminal T3, a current flows through a coil of the insulating logic communication circuit TR2, and thereby the logic signal is supplied to the latch circuit FF.

The latch circuit FF sets an output signal when the supplied logic signal becomes the second level from the first level, and outputs a shutdown signal SHDN of an operation maintenance level to a shutdown input terminal T5 of the assembled battery monitoring circuits 21-24. When a reset signal is supplied to a reset terminal, the latch circuit FF outputs a shutdown signal SHDN of an operation stop level. The shutdown signal SHDN is output to the assembled battery monitoring circuits 21-24 via the output terminal T6 of the interface circuit 604.

The assembled battery monitoring circuits 21-24 continue the operation while the shutdown signal SHDN of the operation maintenance level is supplied to the shutdown input terminal T5, and performs a shutdown process while the shutdown signal SHDN of the operation stop level is supplied to the shutdown input terminal T5.

In the present embodiment, the latch circuit FF is an edge detection type, in which the output signal is set when the logic signal is set to a high (H) level from a low (L) level. Accordingly, the first level of the logic signal is the low level, and the second level is at the high level.

Further, in the present embodiment, the assembled battery monitoring circuits 21-24 maintain the operation state while the shutdown signal SHDN is at the high level, and performs a shutdown process and stops the operation when the shutdown signal SHDN becomes the low level.

That is, in the present embodiment, the control circuit CTR sets the logic signal to the high level from the low level while the assembled battery monitoring circuits 21-24 are activated. Thereby, the shutdown signal SHDN output from the latch circuit FF is set to the high level when the assembled battery monitoring circuits 21-24 are activated.

The latch circuit FF maintains the output of the shutdown signal SHDN at the high level until setting of the shutdown signal SHDN is reset by the signal supplied to a reset terminal R. Accordingly, the operation of the assembled battery monitoring circuits 21-24 is maintained. When setting of the shutdown signal SHDN is reset, the shutdown signal SHDN becomes a low level, and the assembled battery monitoring circuits 21-24 perform a shutdown process.

As described above, the assembled battery monitoring circuits 21-24 are configured so as to continue the operation until setting of the shutdown signal SHDN is reset, even in the period in which the power source supply management module 606 stops supply of the power source voltage. Accordingly, even in the period in which supply of the power source voltage from the power source supply management module 606 is stopped, the assembled battery monitoring circuits 21-24 can continue the operations such as equalization of energy and voltage monitoring, using the energy stored in the assembled batteries 11-14.

In the period in which the power source supply management module 606 stops supply of the power source voltage, the operation of the insulating power source supply circuit TR1, the insulating logic communication circuit TR2, and the switch circuit SWA, which are used for insulating communications of the interface circuit 604, can be stopped, and thereby the power consumption due to the insulating communication circuit is reduced and the external power source 70 is prevented from being consumed.

The shutdown input terminal T5, to which the shutdown signal SHDN is supplied, is grounded via a resistor PD. If the assembled battery module 101(1), for example, is removed from the connector 51, while supply of the power source voltage from the power sources supply management module 606 is stopped and the latch circuit FF is activated by the communication power source voltage signal VDDs from the assembled battery monitoring circuits 21-24, the shutdown input terminal T5 of the assembled battery monitoring circuits 21-24 is grounded via the resistor PD, and its potential is decreased to the low level.

Accordingly, if the assembled battery module 101(1) is removed from the connector 51, the assembled battery module 101(1) performs a shutdown process, and the operation of the assembled battery monitoring circuit 21 is stopped. If the assembled battery modules 101(2)-101(4) are removed from the connectors 52-54, the assembled battery modules 101(2)-101(4) similarly perform a shutdown process, and the operation of the assembled battery monitoring circuits 22-24 is stopped.

If the assembled battery monitoring circuit 21 and the assembled battery monitoring circuit 22 are connected in series via the communicating portions 211, 212, for example, and the communicating portion 211 on the high-end side of the assembled battery monitoring circuit 21 is connected to the interface circuit 604 via a connector, a shutdown signal SHDN is supplied to the communicating portion 212 on the high-end side of the assembled battery monitoring circuit 22 from the communicating portion 211 on the bottom-end side of the assembled battery monitoring circuit 21. In that case, the shutdown input terminal of the assembled battery monitoring circuit 22, to which the shutdown signal SHDN is supplied, is grounded via a resistor.

Accordingly, if the assembled battery module 101(2) is removed from the assembled battery module 101(1), supply of a shutdown signal SHDN from the assembled battery monitoring circuit 21 to the assembled battery monitoring circuit 22 is disconnected, the shutdown input terminal, to which a shutdown signal SHDN is supplied, is grounded via a resistor, and the potential of the shutdown input terminal is decreased to the low level. Thereby, the assembled battery module 101(2) starts a shutdown process, and the operation of the assembled battery monitoring circuit 22 is stopped.

As described above, when the assembled battery modules 101(1)-101(4) are removed in a configuration in which the assembled battery monitoring circuits 21-24 can maintain the state of operations such as energy equalization and voltage monitoring operation even if feeding of the power source supply management module 606 is stopped, the assembled battery monitoring circuits 21-24 are shut down, and its operation can be stopped.

Accordingly, it is possible to reduce consumption of the external power source 70 during the energy equalization and the voltage monitoring operation, and to reduce consumption of energy stored in the assembled battery even when the assembled battery modules 101(1)-101(4) are removed.

Further, as described above, according to the configuration in which the latch circuit FF is operated by the communication power source voltage signal VDDs supplied from the assembled battery monitoring circuits 21-24 via the connectors 51-54, when the assembled battery modules 101(1)-101(4) are removed from the connector while feeding from the power source supply management module 606 is stopped, feeding from the assembled battery monitoring circuits 21-24 to the latch circuit FF is stopped, and output of the latch circuit FF is also stopped.

Accordingly, when the assembled battery modules 101(1)-101(4) are attached next, the output of the latch circuit FF is also stopped, and it is therefore possible to activate the latch circuit FF together with the activation of the assembled battery modules 101(1)-101(4) through a normal activation operation.

Next, the operation will be described when the external power source 70 is removed. The comparator circuit C1 outputs a signal indicating a state of the power source voltage. The comparator circuit C1 outputs a high level signal when a power source signal supplied from the external power source 70 is greater than a predetermined value and outputs a low level signal when a voltage signal supplied from the external power source 70 is smaller than a predetermined value.

The monostable multivibrator C2 outputs a pulse of a predetermined period when the output signal of the comparator circuit C1 indicates that the power source voltage becomes lower than the predetermined voltage. The monostable multivibrator C2 outputs a pulse of a predetermined period when the input signal is set to the low level from the high level.

Accordingly, when the external power source 70 is removed, the one-short circuit C2 outputs a pulse signal of a predetermined period.

The pulse signal output from the monostable multivibrator C2 is supplied to a light-emitting element of a switch circuit SWA of each of the interface circuits 604, via an input terminal T7 of the interface circuit 604. The reset terminal R of the latch circuit FF receives a predetermined potential via the switch circuit SWA and the shutdown signal SHDN is reset to an operation stop level when the pulse is output from the monostable multivibrator C2 to the switch circuit SWA. The pulse of the predetermined period causes the light-emitting element to emit light for a predetermined period of time, and thereby a photo transistor of the switch circuit SWA is turned on. When the photo transistor of the switch circuit SWA is brought into conduction, the reset terminal R of the latch circuit FF is grounded, and a reset signal is supplied.

When the reset signal is supplied to the latch circuit FF, the output of the latch circuit FF is reset, and the latch circuit FF outputs a shutdown signal SHDN of an operation stop level (low level).

Since the switch circuit SWA is turned on by a pulse of a predetermined period output from the monostable multivibrator C2, the power consumption in the switch circuit SWA can be suppressed low.

Thus, by shutting down the assembled battery monitoring circuits 21-24 even if the external power source 70 is removed, the assembled battery monitoring circuits 21-24 can continue their operation when feeding of the power source supply management module 606 is stopped, and thereby consumption of energy stored in the assembled batteries 11-14 can be avoided.

That is, according to the battery management device, the secondary battery device, and the vehicle according to the present embodiment, a battery management device, a secondary battery device, and a vehicle comprising the secondary battery device capable of achieving low power consumption can be provided.

The present invention is not limited to the above-described embodiment and may be embodied with various modifications within the scope of the invention. For example, the description has been made that a shutdown process of the assembled battery monitoring circuits 21-24 is performed when the assembled battery monitoring circuits 21-24 are removed from the connectors 51-54. However, even when the assembled battier monitoring circuits 21-24 and each of the interface circuits 604 is connected without the connectors 51-54, the present invention can be applied by a configuration in which a shutdown process of the assembled battery monitoring circuits 21-24 is performed when an electrical connection is disconnected between the assembled battery monitoring circuits 21-24 and each of the interface circuits 604.

Further, in the above-described embodiment, the operation maintenance level of the shutdown signal SHDN is at the high level and the operation stop level is at the low level. However, the operation maintenance level may be at the low level and the operation stop level may be at the high level.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery management device, comprising:
   a power source supply management module to which a power is supplied from an external power source;
   a power source supply circuit to which a power is supplied from the power source supply management module via a first power source input terminal;
   a latch circuit configured to be operated by a power supplied from the power supply circuit or a power supplied via a second power source input terminal;
   a control circuit configured to output a logic signal that sets a shutdown signal output from the latch circuit to a logic signal input terminal; and
   a logic communication circuit to which a logic signal is supplied via the logic signal input terminal and which supplies the logic signal to a set signal input terminal of the latch circuit, wherein
   the shutdown signal output from the latch circuit is set to an operation maintenance level when the logic signal is set to a second level from a first level.

2. A secondary battery device, comprising:
   the battery management device according to claim 1;
   an assembled battery including a plurality of secondary battery cells; and
   an assembled battery monitoring circuit including a power source circuit, a power source output terminal configured to output a power source signal from the power source circuit to the second power supply terminal and a shutdown input terminal to which the shutdown signal output from the latch circuit is input, and configured to measure a state of the assembled battery, wherein
   the control circuit sets the shutdown signal output from the latch circuit to an operation maintainance level by setting the logic signal to the second level from the first level upon activation of the assembled battery monitoring circuit, so as to continue an operation of the assembled battery monitoring circuit, and
   the shutdown input terminal is grounded via a resistor.

3. The secondary battery device according to claim 2, comprising:
   a comparator circuit to which a power source voltage is supplied from an external power source and which outputs a signal indicating a state of the power source voltage;
   a monostable multivibrator configured to output a pulse of a predetermined period when the output signal of the comparator circuit indicates that the power source voltage becomes lower than the predetermined voltage; and
   a switch circuit to which an output signal of the monostable multivibrator is supplied, wherein
   a reset terminal of the latch circuit receives a predetermined potential via the switch circuit and the shutdown signal is reset to an operation stop level when the pulse is output from the monostable multivibrator to the switch circuit.

4. The secondary battery device according to claim 2, further comprising:
   a second assembled battery including a plurality of secondary battery cells; and
   a second assembled battery monitoring circuit which includes a second shutdown input terminal and measures a state of the second assembled battery, a shutdown signal being input to the second shutdown input terminal via the assembled battery monitoring circuit from the latch circuit, wherein
   the second shutdown input terminal is grounded via a resistor.

5. A vehicle comprising the secondary battery device according to claim 2.

* * * * *